*INVENTOR.*
HENRY W. KROHN
JOSEPH S. HAWKES
BY MALCOLM G. ANDERSON
RALPH K. BOYER

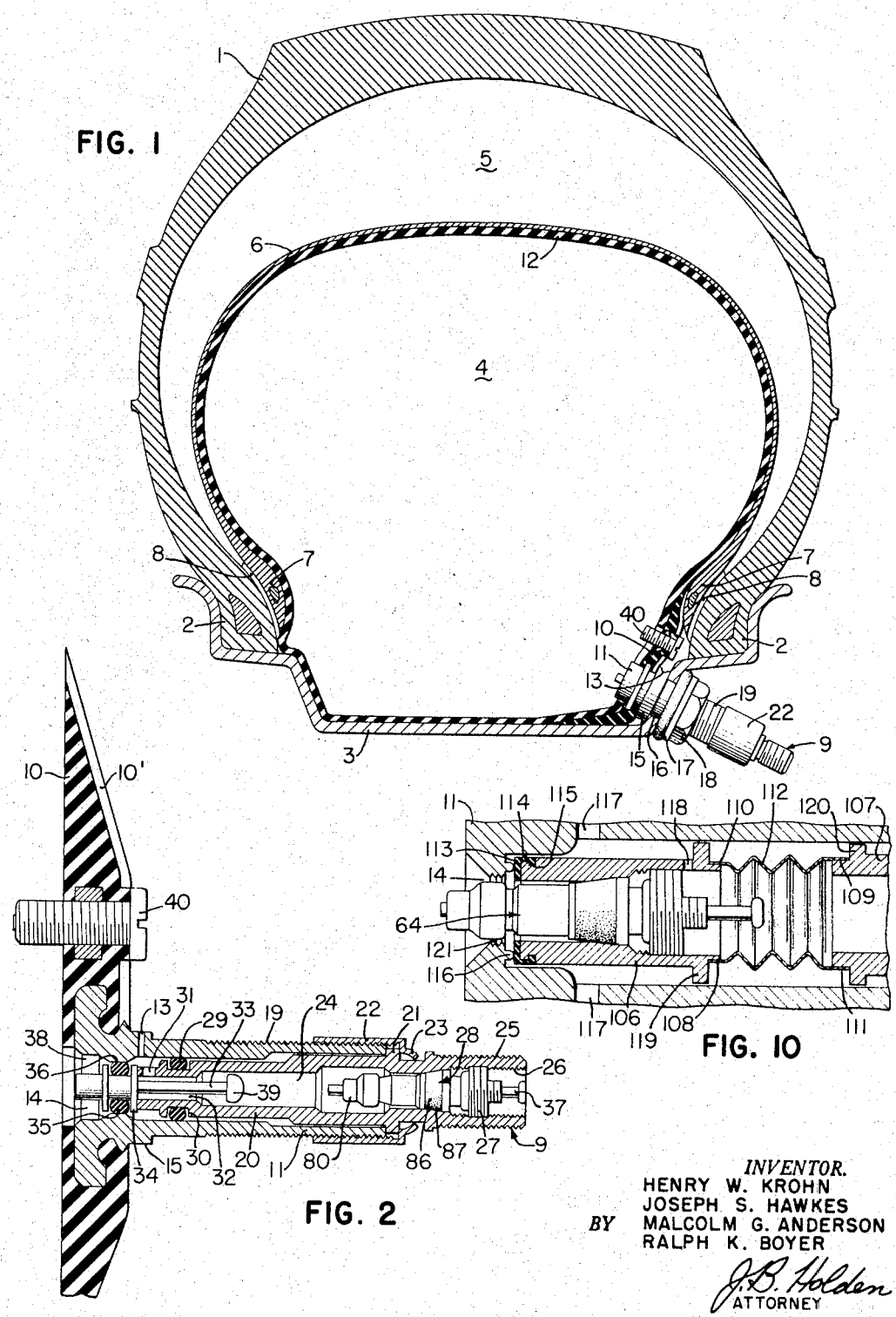

*J.B. Holden*
ATTORNEY

*INVENTOR.*
HENRY W. KROHN
JOSEPH S. HAWKES
BY MALCOLM G. ANDERSON
RALPH K. BOYER

*J.B. Holden*
ATTORNEY

3,361,153
TIRE VALVE FOR DUAL-CHAMBERED TIRES PROVIDING FOR SIMULTANEOUS BUT UNEQUAL INFLATION AND DEFLATION OF SAID CHAMBERS

Henry W. Krohn, North Olmsted, and Joseph S. Hawkes, Cuyahoga Falls, Ohio, Malcolm G. Anderson, Bradenton, Fla., and Ralph K. Boyer, Cleveland, Ohio, assignors to The Goodyear Tire & Rubber Company, Akron, Ohio, a corporation of Ohio
Continuation of application Ser. No. 232,724, Oct. 24, 1962. This application Nov. 8, 1965, Ser. No. 506,693
13 Claims. (Cl. 137—234.5)

This application is a continuation of our application Ser. No. 232,724 filed Oct. 24, 1962, now abandoned.

The present invention relates to tires provided with inner and outer air chambers and particularly to tubeless tires provided with such chambers. More specifically, the invention relates to the valve used for simultaneous inflation of both chambers in a manner to create and maintain a higher pressure in the inner chamber than in the outer chamber and to the means for releasing excess pressure in the inner chamber.

One object of the invention is to provide a valve for single inflation of both chambers using the same inflation techniques and standard inflation equipment used for inflating a single chamber.

Another object is to provide means for checking the pressure in the outer chamber without releasing air from the inner chamber. The inner chamber pressure may also be checked, if necessary, by using a special adapter.

Another object is to provide for quick deflation of both chambers.

Another object is to provide means for releasing air from the inner chamber when and if it exceeds a desired predetermined amount.

A more specific object of this invention is to combine the function of two valve cores in one whereby the valve core permits inflation of an air chamber and when the air pressure in that chamber builds up beyond a predetermined desired pressure, the valve core will release the excess pressure automatically.

Another object of this invention is to utilize the valve housing as an auxiliary valve to release the pressure in the inner chamber when it builds up beyond that desired.

Other objects and advantages of this invention will become apparent hereinafter as the description thereof proceeds, the novel features, arrangements and combinations being clearly pointed out in the specification as well as the claims thereunto appended.

While the valve is illustrated in connection with a specific safety tire it is to be understood that it may be used with other plural chambered safety tires.

In the drawings:

FIG. 1 is a cross-section of a safety tire mounted on a rim and equipped with a valve made according to this invention;

FIG. 2 is a longitudinal cross-section of the valve means shown in FIG. 1;

Figure 4:
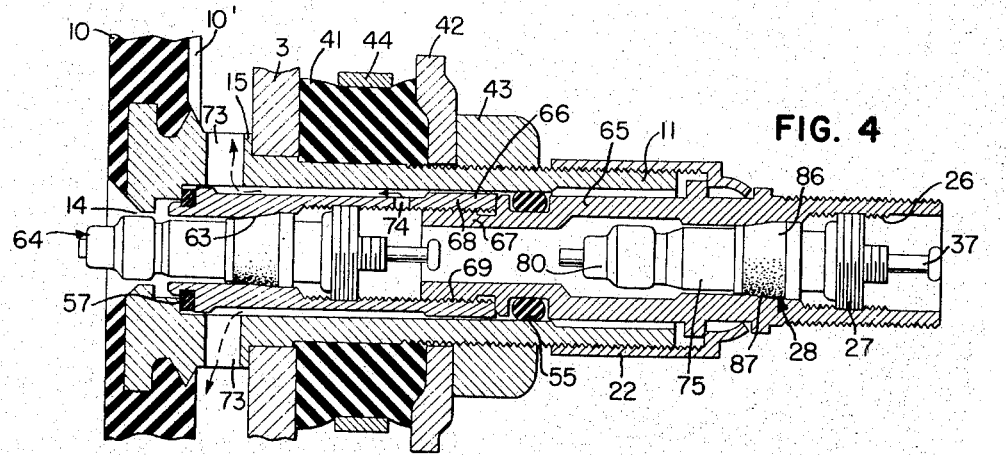
Figure 5:
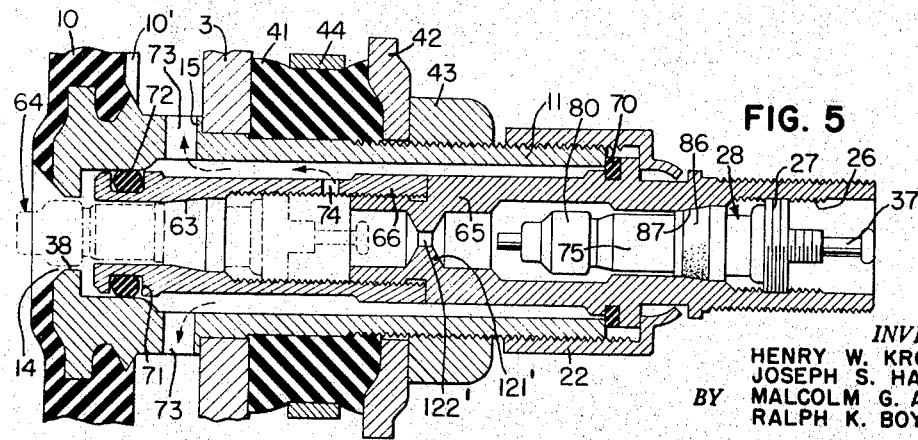
Figure 6:
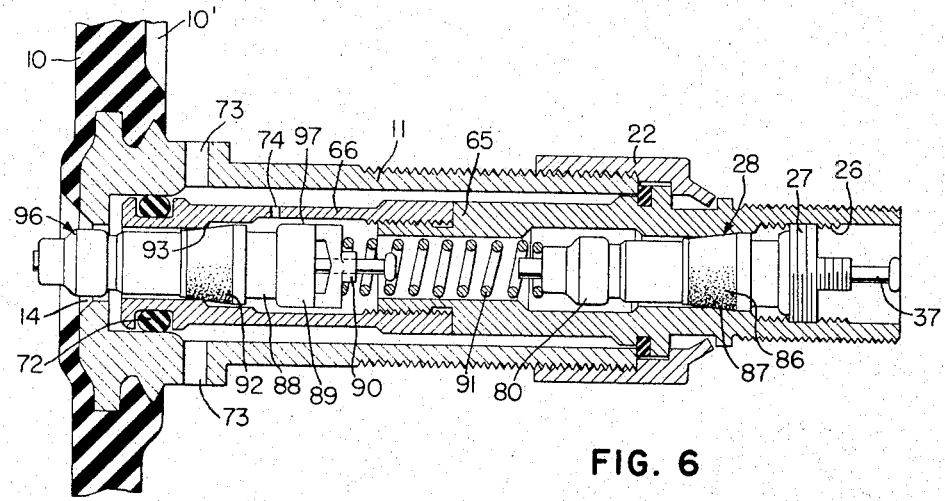
Figure 7:
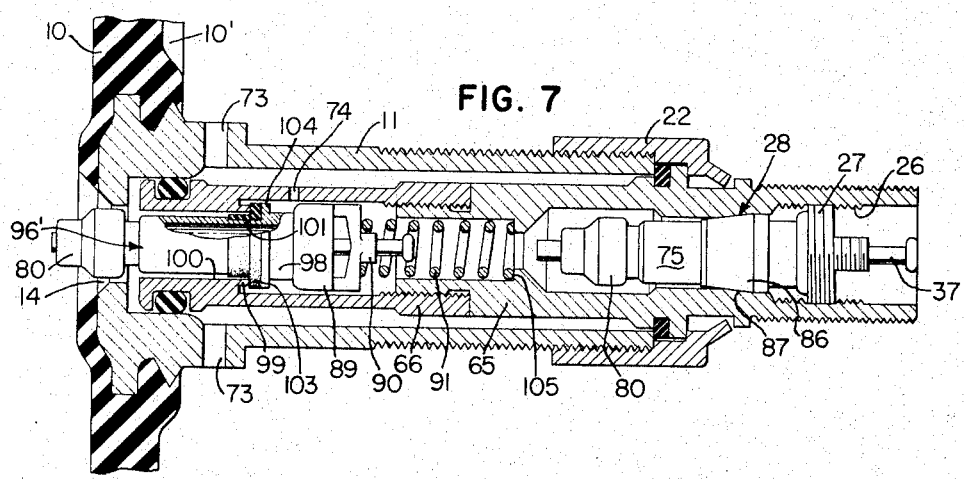
Figure 8:
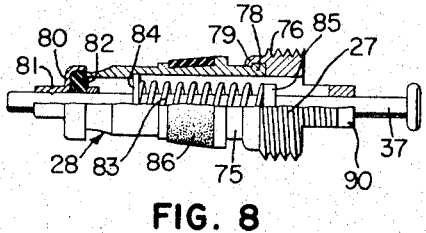
Figure 9:
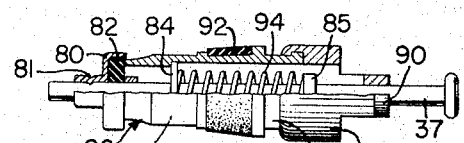

FIGS. 3 to 7 and 10 inclusive are similar cross-sections of modified forms of the valve shown in FIG. 2;

FIG. 8 is a longitudinal cross-section of the outer valve core shown in FIGS. 2 to 7 inclusive; and FIG. 9 is a longitudinal cross-section of the inner valve core shown in FIG. 6.

In FIG. 1, a tubeless pneumatic tire 1 having beaded edges 2 mounted on a rim 3 forms an air space divided into inner and outer air chambers 4 and 5 by means of an inner tire 6 having beaded edges 7 engaging the inner surface of tire 1 adjacent the beaded edges 2 but, as shown, are not in contact with the rim 3. However, these beaded edges 7 may be constructed to seat on the rim if desired. Radial grooves 8 are provided in the outer surfaces of beaded edges 7 to provide passages through which air may be supplied to the outer chamber from a valve generally designated by the numeral 9. The inner tire 6 is preferably substantially inextensible to avoid any material expansion thereof under the normally higher pressure in the chamber 4 during normal operation and also during emergency operation when the outer chamber 5 is deflated as by a puncture or blowout of tire 1.

A rubber base 10 having grooves 10' and formed integral with a metal stem 11 is attached to the tube 12 in the usual manner. The stem (shown in detail in FIG. 2) has a lateral metering port 13 through which air may flow to the outer chamber 5 through grooves 10' and 8. It also has an axial port 14 (FIG. 2) through which air may pass into the inner chamber 4. In FIG. 1 the stem is shown provided with an enlarged annular flange 15 forming a shoulder engaging the inner surface of the rim 3 around the valve hole 16 through which the stem 11 extends. A rubber washer 17 on the stem 11 engages the outer surface of the rim 3 and a nut 18 threaded on threads 19 of the stem 11 is used to compress the rubber washer and seal the stem on the rim in airtight relation thereto. Any suitable sealing means may be employed for this purpose.

Referring now to FIG. 2, it will be noted that inside the stem 11 is a housing 20 having a flange 21 engaging the outer end of stem 11 and the housing is releasably held in this position by means of the internally threaded nut 22 engaging the threads 19 and having a flange 23 overlying the flange 21.

The housing 20 has a longitudinal passage 24 extending therethrough from one end thereof to the other. The outer end of this housing is threaded at 25 to receive the usual valve cap (not shown) and is internally threaded at 26 to receive the threaded swivel 27 of a valve core 28 of any desired construction (such as that shown in FIG. 8). The housing 20 is sealed to the stem 11 intermediate its ends by an O-ring 29 arranged in a groove 30 in the housing.

The inner end of the housing 20 is provided with a lateral port 31 of a size at least equal to that of the port 13 but preferably larger. This forms a communication between the passage 32 in the housing 20 and port 13.

Loosely mounted in passage 32 in the housing 20 is a valve stem 33 having flanges 34 for retaining an O-ring 35 therebetween. This O-ring 35, in the position shown in FIG. 2, closes the opening 36 formed by a reduced portion of the stem 11.

When inflating, the pin 37 of valve core 28 is depressed to allow air to enter the passage 24 and the pressure of the air opens the inner valve to permit air to flow to the inner chamber 4 through port 14 and to the outer chamber 5 through metering port 13. After inflation the pressure in chamber 4 closes the inner valve but port 31 still permits flow of air between the passage 24 and the outer chamber 5. Thus, it is possible to check the pressure in chamber 5 by use of a pressure gauge in the usual manner. Such action does not open the inner valve. The pressure in chamber 4 may be measured by removing valve core 28 and using a gauge with a long depressing pin to open the inner valve.

When the inner valve is open the clearance between the O-ring 35 and the enlarged portion 38 in the valve stem determines the rate of air flow through the port 14 into the inner chamber 4. The effective cross-sectional area of the port 14 is determined by the cross-sectional area of the space between the O-ring 35 and the opening 38 and is so proportioned with respect to the effective cross-section of the passage 13 that air will flow into the inner chamber 4 at a rate such that there will be a more rapid build-up of the pressure in that chamber than in the outer chamber 5.

In order to simultaneously deflate both chambers 4 and 5 quickly, the nut 22 is unthreaded from the stem 9 and the housing 20 is bodily removed from the stem. Air discharges from the chambers 4 and 5 through the ports 14 and 13 respectively. The stem 33 is provided with an upset head 39 which is larger than the reduced diameter 32 to thus limit movement of the stem to the left and to provide means whereby, upon the removal of the housing 20, the stem 33 and the O-ring 35 are constrained to move therewith leaving the passage 24 through the stem unrestricted.

A relief valve 40 in the base 10 opens at a predetermined differential pressure to discharge air from the inner chamber 4 to the outer chamber 5 if the pressure in the chamber 4 exceeds a predetermined amount. This will build up the pressure in chamber 5 but this pressure is readily reduced to the desired pressure by depressing the pin 37 so that air may flow from chamber 5 to the atmosphere. A more detailed description of the relief valve 40 and its purpose are more thoroughly described in connection with FIG. 3.

After mounting the tire 6 and the tube 12 in the tire 1, air is introduced into the valve to at least partially inflate the inner chamber so as to move the beads of the outer tire 1 outwardly into seated position on rim 3. To insure the mounting of the beads of the inner tire 6 against the beads of the outer tire 1, it is recommended to deflate both chambers and reinflate same, during which reinflation the inner tire 6 has an opportunity to adjust itself in symmetrical relation to the outer tire. It is to be noted, however, that if the housing 20 is removed, air will rush out of the inner chamber and the inner tire will collapse because the opening 13 is relatively small and air cannot escape from the outer chamber very rapidly. Thus, on reinflation there may be a condition where the volumes and/or pressures of the two chambers are out of proportion. Then, on reinflation, even though the ports 13 and 14 are designed to normally give the proper amount of air to both chambers to build up the superior pressure in the inner chamber, it will be noted that on reinflation as air moves into the inner chamber it will expand and compress the air in the outer chamber, raising its pressure quickly, and then as air continues to move into the outer chamber and the inner chamber it is possible that the pressure in the inner chamber may not build up to the desired differential pressure to insure sufficient seating of the beads 7 of the inner tire 6 on the inner surface of the tire 1. A careful manipulation may avoid this but in FIGURES 3–7 inclusive and 10 it will be noted that the metering opening is in the housing, whereby as will appear later, the removal of the housing permits air to escape rapidly from both chambers. Thus, on reinflation, the problem of building up the pressure to that desired in the inner chamber is not a problem.

FIGURES 3–7 inclusive show modifications of the structure illustrated in FIGURE 2, but basically in all of these figures the valve cores are carried by a housing removably positioned within the stem of the valve so that, for deflation purposes, the housing may be removed to allow free flow of the air from both chambers. Throughout the drawings similar reference characters refer to similar parts.

Figure 3:
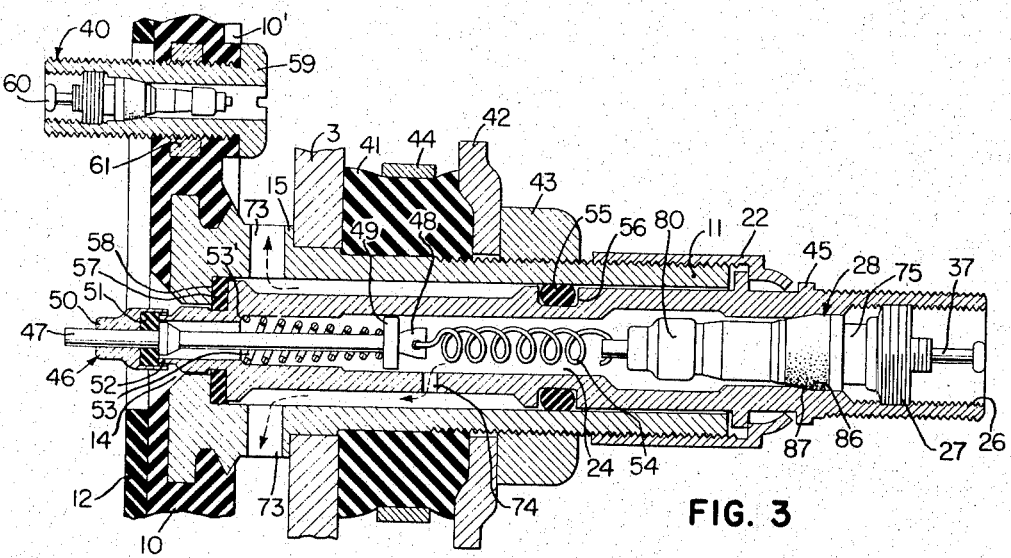

A slightly modified form of means for sealing the valve stem to the rim is shown in FIGURES 3, 4 and 5. This means may be used with the valves shown in FIGS. 6 and 7 where the sealing means is not shown. The rim 3 is provided with an opening to receive the valve stem 11 and the stem has the shoulder 15 abutting against the inside of the rim. A rubber washer 41 surrounding the stem is compressed against the outer surface of the rim by a metal washer 42 when the nut 43, threaded on the stem, is turned to move the washer 42 to the left. In order to prevent excess radial expansion of the thick rubber washer 41, it is provided with a metal band 44 surrounding the rubber washer at its mid-section. This construction is illustrative only and is not a part of the present invention.

In FIGURE 3, the stem is provided with a housing 45 which houses the two valve cores 28 and 46. The construction of valve core 28 is not important and may be of any type, such as shown in FIG. 8. It is used only to admit air to the passage 24 or to remove air therefrom. The valve core 46 takes the place of the inner valve in FIGURE 2 and is designed to accomplish a similar purpose. The valve core 46 comprises a stem 47 having an enlarged head 48, a washer 49, loosely mounted on the stem, and at its inner end it is provided with a cup-shaped valve 50 having a sealing washer 51 adapted to seat against the inner end 52 of the housing 45 when the valve 50 is in closed position as shown in FIG. 3. A spring 53 abutting against a shoulder 53' on the inside of the housing 45 and against the washer 49 on the pin 47 normally urges the valve to closed position as shown. This spring 53 is a relatively low rate spring permitting opening of valve 50 under the pressure of air in the passage 24 during inflation and it also insures positive return of the valve 50 to the position shown in FIGURE 3 when valve 28 closes. Thereafter, it assists in holding the valve 50 closed under the action of centrifugal force when the tire rotates. The superior pressure of the air in the inner chamber also acts to hold the valve closed. A spring such as 53 also could be provided for the inner valve in FIG. 2.

A second spring 54 has the ends thereof attached to the enlarged head 48 on the pin 47 and to the inner end of the pin 37 forming part of the valve core 28. This spring is a tension spring and in the position shown in FIG. 3 it is under some tension. During inflation it offers substantially no resistance to the opening of the valve 50, since when the pin 37 is depressed during inflation, the spring 54 is actually foreshortened and becomes slack. Therefore, the inflation pressure is only required to overcome the pressure exerted by spring 53. After inflation, the spring 54 assists in closing the inner valve 50 since as the pin 37 moves to the right to closed position, the spring is again distended and pulls on the stem 47. Note that when valve 28 is opened to check the pressure in chamber 5, the valve 50 will remain closed.

In order to seal the housing 45 to the stem, an O-ring 55, mounted in a groove 56 in the housing, abuts the inner wall of the valve stem 11. The inner end of the housing is provided with a flat sealing washer 57 abutting against a shoulder 58 on the inner end of the valve stem 11. The threaded nut 22 is used to move the housing in a direction to compress the washer 57 and seal the housing to the stem.

The opposing walls of the stem and housing, washer 57 and O-ring 55 form an air chamber to which air is supplied during inflation from the passage 24 through the metering port 74 and then through the ports 73 into the outer chamber.

The pressure in the inner chamber 4 should exceed by a substantial amount the pressure in the outer chamber 5 in order to maintain the beads 7 of the inner tire 6 firmly in engagement with the outer tire to thus prevent shifting of the inner and outer tires relative to each other during normal and emergency operation. However, it is possible that the pressure in chamber 4 may build up, as on successive re-inflations for example, to a dangerously high pressure and this may cause a failure of the inner tire 6 either during normal or emergency operation. As used herein, the term "differential pressure" means the excess gauge pressure in the inner chamber over that in the outer chamber. If the pressure in the outer chamber were 24 pounds and the pressure in the inner chamber were 64 pounds, then the differential pressure would be 40 pounds. Preferably, the minimum differential pressure should be in the order of 10 to 12 pounds to hold the beads of the tires in firm engagement. If 40 pounds is established as the desired maximum differential pressure, then means should be provided for relieving the pressure in chamber 4 when the differential pressure exceeds 40 pounds. To accomplish this, a relief valve 40 is mounted in the base 10. This comprises a housing 59 provided with any desired valve core 60 such as that shown in FIG. 8. The housing 59 is threaded into a nut 61 molded in the rubber base 10 provided with grooves 10'. The valve core 60 is designed to open when the desired differential pressure is exceeded and discharges air from the inner chamber 4 into the outer chamber 5 through grooves 10' and 8. This will increase the gauge pressure in chamber 5 but this may be reduced to the desired pressure by opening valve 28. While this valve 40 is not shown in FIGS. 4 and 5 it is understood such is provided in the base 10 the same as in FIG. 3.

In the form of the invention shown in FIG. 4 instead of using the end 52 of the housing 45 as a seat for the valve 51 as in FIG. 3, the inner surface of the housing at 63 is formed with a tapered seat on which is seated a valve core 64 similar to the valve core 28 shown in FIG. 8 except that it is provided with a much lower rate spring so that it will permit opening of the valve under the pressure of the air in passage 24 during inflation. This spring performs the same function as the spring 53 in FIG. 3. A spring such as 54 shown in FIG. 3, is not shown in FIG. 4 or FIG. 5, although one may be provided in these latter figures to provide an additional holding force to keep the valve closed after inflation without interfering with normal inflation.

In view of the fact that the core 64 must be mounted from the inside of the housing, it is necessary to form the housing of an outer section 65 and an inner section 66. When separated, the core 64 is threaded into the housing section 66. Then, the two sections 65 and 66 are joined to form an integral housing to insure that the two sections cannot be readily separated and to insure a substantially airtight joint. Core 28 may be mounted before or after joining the sections. One way of joining the sections is to provide the adjacent ends 67 and 68 with external and internal threads at 69 to which a bonding cement is applied whereby, after the two housing sections are joined, the bonding cement will hold them together in airtight relation. These sections may also be united by swaging or by using a press fit or by any other suitable means. The reason for securing the sections together in this manner is to prevent substituting an improper core, such as one like core 28 for the valve core 64, which action would prevent air entering the inner chamber since the core 28 is designed to open only by depressing the pin 37. The outer core 28 may be replaced in the usual manner if it is defective. If the inner valve 64 is defective, a new housing 65–66, equipped with a new valve 64, must be used and the old one discarded. Note that the housing 65–66 is sealed to the stem by the O-ring 55 and the flat washer 57, the same as in FIG. 3.

In FIGURE 5, I have illustrated the same type of valve as illustrated in FIGURE 4, and the only difference is that the housing 65–66 is provided with a flat washer 70 which abuts against the outer end of the stem 11 to seal the outer end of the housing with respect to the stem. The inner end of the housing is provided with a groove 71 in which there is an O-ring 72 engaging the inner adjacent wall of the stem 11 to effect a seal at the inner end of the housing with the stem, the reverse of that shown in FIG. 4.

The disadvantage of using the sealing means in FIGURE 4 is that, if the nut 22 should become loose, air from the inner chamber may leak past the washer 57 into the outer chamber to eventually cause an equalization of the pressures in the two chambers. This is not desired because under such circumstances the beaded edges of the inner tire 6 will not be held firmly against the inner walls of the outer tire 4 and the inner tire may become eccentrically arranged within the outer tire.

Note, however, that with the construction shown in FIGURE 5, if the nut 22 loosens enough to destroy the seal effected by the washer 70, no particular harm is done because even though the housing 65–66 moves to the right, the O-ring seal 72 will still seal the housing to the stem and no air can leak from the inner chamber unless the movement of the housing is enough to move the O-ring out of the adjacent reduced portion of the housing. This will maintain the air pressure in the inner chamber and permit operation of the vehicle even though the outer chamber becomes deflated. It also prevents the collapse of the tire for subsequent reinflation.

In FIGURES 3, 4 and 5 the metering of the air to the outer chamber is accomplished in a slightly different manner than in FIGURE 2. The stem at its inner end is provided with one or more relatively large radial ports 73 which permit the air to flow freely to the outer chamber from the air compartment formed by the housing 65–66, the stem 11 and the longitudinally spaced seals 70 and 72 between the housing and stem. In order to restrict the amount of air that will flow into the outer chamber, the housing 65–66 in each case is provided with a third or metering port 74 which is of a restricted cross-section the same as port 13 in FIG. 2. The effective cross-sections of the air passages through cores 64 and 74 should be as specified in connection with ports 14 and 13 respectively in FIG. 2. With this arrangement, when it is desired to mount or dismount the tire on a rim, removal of the housing 65–66 from the stem provides large openings leading from both chambers to the atmosphere and, therefore, both chambers deflate rapidly. In this way the disadvantages described in connection with FIG. 2 are avoided.

In all of the construction so far described it is apparent that on inflation, air enters the outer valve 28 and passes through a metering opening into the outer chamber 5 and the inner valve opens under the inflation pressure and meters the amount of air flowing into the inner chamber. After inflation the inner valve then closes under the higher air pressure in the inner chamber and the influence of the associated spring if one is used as in FIG. 3. The arrows indicate the flow of air during inflation.

In order to clearly illustrate the difference between the cores 28 and 96 in FIG. 6, their constructions are shown in detail in FIGS. 8 and 9 respectively.

The core 28 in FIG. 8 comprises a barrel 75 having the swivel 27 externally threaded at 76 for engagement with the threads 26 (FIGS. 2–7) in the valve housing 20 or 65–66. This swivel is rotatably mounted on the barrel 75 by means of a peripherally extending flange 78 on the barrel loosely fitting within a groove 79 in the swivel. The pin 37 extends through the swivel and barrel and at the inner end has a cup-shaped valve 80 crimped at 81 to the pin 37 and provided with a rubber or like sealing washer 82. This valve 80 closes the open end of the barrel 75 under the influence of a compression spring 83 having an enlarged end 84 abutting a shoulder on the barrel and an enlargement 85 on the pin 37. On depression of the pin 37 by means of an air chuck or the like, the valve 80 moves to the left and opens the passage through the barrel. Exteriorly of the barrel is a sealing washer 86 which is adapted to seat on the tapered seat 87 in the housing 20, 45 or 65–66.

In FIGURES 6 and 9 the inner core 96 comprises a barrel 88 having a cylindrical extension 89 rotatably mounted on the barrel 88 in a manner similar to the mounting of the swivel 76 on the barrel 75 in FIG. 8. The outer diameter of the barrel 88 is less than the inner diameter of the inner housing section 66 so that the barrel may slide freely in that housing. The cylindrical extension is also provided with a boss 90 which acts as a means for centering a spring 91 which abuts against the inner end of the cup-shaped valve 80 and the extension 89 to urge the tapered sealing washer 92 on the barrel 88 into engagement with the seat 93 on the housing 65–66, (FIG. 6). The spring 94 acts in a manner similar to the spring 83 in FIGURE 8, but spring 94 is a lower rate spring designed to permit the cup-shaped valve 80 (FIG. 9) on the stem 37 to open under the inflation pressure whereby the mere mechanical opening of the valve 28 will not open the valve 80 (FIG. 9). Thus, the pressure in the outer chamber 5 may be measured by applying the pressure gauge to the valve stem to open the valve 28 while retaining the air in the inner chamber, since the inner valve is not opened by movement of the outer valve.

The spring 91 (FIG. 6) on the other hand is a heavy spring adapted to hold the barrel 88 of inner valve core on its seat 93 and to permit movement of the barrel and associated parts off the seat 93 when the differential pressure between the chambers 4 and 5 exceeds the spring pressure, such as the 40 pounds previously mentioned whereby the air can escape into the passage in the housing and then through the opening 74 and 73 into the outer chamber. After the excess pressure is removed from the inner chamber, the increased pressure in the outer chamber may be relieved by depressing the pin 37. Actually, as pointed out in connection with the previously described forms of this invention, the spring 94 may be eliminated and the valve 80 held in closed position merely by the air pressure in the inner chamber, but the spring 94 is preferred to insure positive closing of the valve.

In FIG. 6 the functions of the relief valve 40 and the inner core of the main valve in FIGS. 2–5 inclusive are combined in the inner valve 96 made according to FIG. 9 to avoid the added expense of the additional material and the added labor in applying a valve such as 40. The critical feature of the invention shown in FIG. 6 is in utilizing the valve barrel 88 as a relief valve so that it functions to let air out of the inner chamber when that inner chamber pressure exceeds the desired pressure differential. For this purpose, the cylindrical extension 89 is not provided with threads but instead is made smooth as is the adjacent surface of the housing section 65–66 and its diameter is sufficiently less than the inner diameter of the housing to provide a clearance space 97.

It must be borne in mind that excessive differential pressure may cause the inner tire to fail. Therefore, if the inner chamber gauge pressure is 64 pounds and the outer chamber gauge pressure is 24 pounds, there is only a differential pressure of 40 pounds between the two chambers and the inner tire would not be subjected to any greater rupturing force during normal operation than if the gauge pressures in the two chambers were at a lower level but still at the same differential pressure.

In case of a blowout or a puncture, air is discharged from the outer chamber. This decreases the gauge pressure in chamber 5 to thus increase the differential pressure between the two chambers 4 and 5 and when the maximum differential pressure is exceeded, air escapes from the inner chamber into the outer chamber 5 and from this chamber the air passes out of the tire through the puncture or the opening formed by the blowout.

Assuming the gauge pressure in the inner chamber is 64 pounds, and that in the outer chamber is 24 pounds, it is obvious that a blowout will suddenly release the air from the outer chamber and the inner tire 6 will be subjected to 64 pounds of pressure until the relief valve opens and drops the gauge pressure therein to that of the differential pressure of 40 pounds. The differential pressure should be preferably more than the normal gauge pressure in the outer chamber so that under run flat conditions with the inner tire carrying the load the beads 7 of tire 6 will be held firmly against the outer tire 1 and prevent the inner tire becoming eccentrically arranged within the outer tire. This also insures stability to the outer tire. It also insures a greater rolling radius because of the higher pressure. It is obvious that a differential pressure of 15 pounds might not be sufficient under run flat conditions although it may be sufficient under normal conditions when the inner tire is not carrying the load. Frequently, along today's superhighways, it is dangerous to try to stop and make such a repair or change along the highway and in places it is prohibited. On some roads it is impossible to find a sufficient shoulder to conveniently make such a change or repair.

In order to insure that the continued operation of the vehicle may be at least a fair rate of speed and even normal speed, it is desirable to place a lubricant within the chamber 5 so as to lubricate the contacting walls of the inner and outer tires under emergency conditions. Such a lubricant should be non-compatible with the surfaces of the outer chamber so that it will be always ready to act as a lubricant if a blowout or puncture occurs.

In FIG. 7 the inner valve core 96' is similar to core 96 in FIG. 6. The valve barrel 98 thereof is similar in construction and function to the barrel 88 in FIG. 9. The only change is in the contours of the barrel and its seating arrangement in the housing. Note that the housing 65–66 is provided with a relatively narrow, axially extending annular seat 99 at one end of the reduced opening 100 of the housing. The barrel is provided with a rubber seal formed by a cylindrical part 101 surrounding the barrel 98 and a radially flanged portion 103 which abuts against the axially extending seat 99. A flange 104 on the barrel acts as a back-up member for the flanged portion 103 of the rubber washer. The operation of this valve core 96' is the same as valve core 96 shown in FIG. 6, but it is to be noted that since there is no wedging action of the portion 103 on the barrel and the seat 99 on the housing the valve barrel 98 will move off its seat more uniformly than in FIG. 6 since the seat on the housing and the tapered sealing washer on the barrel as in FIG. 6 may bind and require a greater differential pressure to unseat the barrel.

In FIG. 7, the spring 91 abuts against a shoulder 105 formed by a reduced portion of the housing whereby removal of the valve 28 from the housing will not release the spring pressure of spring 91 and air will not be released from the chamber 4. Nor will the spring 91 have a chance to fall out of the passage in the housing. In FIG. 6 this could happen and not be noticed. Then when valve 28 is replaced, the inner valve will not function. In FIG. 7 the spring 91 must be assembled when the two sections 65 and 66 of the housing are being assembled. The spring is placed in the inner section 66 of the housing and then the other section 65 is assembled by threading the two sections together. Thus, if the valve core 28 is then removed, the spring 91 will remain in place.

While it is possible in a construction of this kind to provide a sectional housing 65–66 in which the two sections may be separated for replacement of the inner valve core, such permitted replacement is not desirable since a valve core of the wrong spring pressure may be used as a replacement.

In the modification shown in FIG. 10 the stem 11 is provided with a three-part housing to take the place of the housings 65–66 in FIGS. 4–7 inclusive. The tubular sections 106 and 107 have annular seats 108 and 109 embraced by the annular ends 110 and 111 respectively of a bellows type compression spring 112 which urges the sections 106 and 107 away from each other. The inner end of section 106 is provided with rubber washer 113 cemented thereto or (as shown) provided with a lip 114 fitted in a groove 115 in the housing. An annular seat 116 formed at the inner end of the stem is engaged by the rubber washer 113 to seal the housing to the stem at its inner end.

The outer end of section 107 may be formed as shown in FIG. 5 and sealed to the stem 11 as in FIG. 5 by use of a nut 22 and flat washer 70. The overall length of the housing when the spring is relaxed is sufficiently long to protrude beyond the stem when the washer 113 engages the seat 116, whereby when a nut 22 such as in the other figures is screwed down into sealing position the sections 106 and 107 move toward each other and compress the spring 112 sufficiently to hold the seal 113 on the seat 116 with a pressure sufficient to overcome the differential pressure between the chambers until the differential pressure in the inner chamber 4 reaches the maximum differential pressure desired, after which the inner housing 106 is caused to move toward section 107 against the action of spring 112 and thus permit air to pass from the inner chamber around the housing section 106 to the large openings 117 in the stem and the metering opening 118 in the housing. Thereafter, the pressure in the chamber 5 above that desired may be relieved by opening the valve in the outer core 28 as described with reference to the other forms of the invention. The inner housing 106 has a core 64 the same as in FIGS. 4 and 5 to permit air to enter the inner chamber during inflation. The sections 106 and 107 may be provided with enlarged guiding flanges 119 and 120 respectively or the sections may have a sufficient outer diameter to have a loose sliding fit in the stem to thus avoid lateral flexing strains on the spring 112.

The inner end of the stem is provided with threads 121 into which one end of a fishing tool (not shown) may be threaded. Such a tool is attached to the valve to pull the valve through a hole in a rim and is usually threaded on the threads 25 for the valve cap. However, due to the fact rim holes are small and the present valve is of necessity larger in diameter than standard valves, the threaded portion must be on the inside to permit the valve to be withdrawn from the hole. The housing is first removed and fishing tool would then be threaded in place. Such a tool generally employs a flexible cord or chain which is first manually inserted through the rim hole from the inside as is well understood in the art. Similar threads may be provided in the other forms of the invention illustrated.

Essentially in all FIGS. 1–7 and 10 there are three valves for controlling the pressures in the chambers and in FIGS 1–5 inclusive these are separate structures. These valves will be referred to as the "first valve" such as 28, for controlling the flow of air into and out of said housing; the "second inflation valve" such as 64 for controlling the flow of air between said housing and inner chamber and the "third valve" such as 40 for discharging air from the inner chamber when the differential pressure is exceeded. In FIGS. 6 and 7, however, while the first valve is separate, the second valve is combined in a single valve core with the third valve, and in FIG. 10 the portion 106 of the housing acts as the relief valve. Their operations, however, are somewhat different than the corresponding valves in FIGS. 1 through 5. In FIGS. 6, 7 and 10 the three valves are all mounted on the stem and all three are removable with the housing, whereas in FIGS. 1–5 inclusive the relief valve 40 is fixed in the base 10 and is not removable with the housing.

It is desirable to maintain the flow of air through ports 14 and 74 in the same proportion regardless of the air line pressure used since a wide variance in the air line pressures may cause a wide variance in the proportionate flow of air to the chambers due primarily to the fact that the air supplied to the port 14 travels in substantially a straight path and the air supplied to the port 74 must change direction in order to move laterally through port 74. In order to accomplish this result, FIG. 5 shows a wall 121' in the housing having a metering opening 122' to restrict the flow of air from the supply line so that the resulting pressure in the housing inwardly of the restricted passage is somewhat the same for different air line pressures. Of course, any excess pressure in the inner chamber will be automatically relieved by the relief valve 40, but it is entirely possible that the restricted opening 122' may be made of a size to so control the flow of air into the inner end of the housing that the relief valve 40 may be eliminated. The size of the opening 122' may be in the order of .030 to .050 inch.

Essentially in all forms of the invention the housing and the stem together with the sealing means between the housing and the stem form an air compartment to which air is supplied through the port 31 (FIG. 2), the port 74 (FIGS. 3 to 7), or port 118 (FIG. 10) in the housing. The chamber 5 is supplied with air from said compartment through the respective metering ports 73, 13 and 117 of the other figures. The ports in the stems at the inner ends thereof supply air to the inner chamber from the housing when the inner valves are open. When one of the inner valves is closed, it seals off communication between the inner and outer chambers. This permits checking the pressure in the outer chamber without releasing any air from the inner chamber.

In the claims the terms "outer end" and "inner end" as applied to the ends of the stem or housing are respectively the right and left ends thereof as viewed in the drawings.

When the term "port" is used in the claims, this term is to be understood as including a plurality of ports having the function and combined cross-sections substantially the same as that of a single port suitable for the purposes specified.

While certain representative embodiments and details have been shown for the purpose of illustrating the invention, it will be apparent to those skilled in the art that various changes and modifications may be made therein without departing from the spirit or scope of the invention.

We claim:

1. In combination, a tire having inner and outer chambers, valve mechanism for inflating said chambers comprising a hollow valve stem having a first port for communicating with said outer chamber and a second port for communicating with said inner chamber, a housing removably mounted in said stem having a longitudinal air passage therethrough and provided with a metering port in open communication with said first port to permit free flow of air from said passage to and through said first port, longitudinally spaced sealing means between the adjacent walls of said stem and housing for sealing the space therebetween at opposite sides of said first and metering ports, a normally closed first valve on said housing at the outer end of said passage in said housing openable to permit air from a source of air under pressure to enter said passage, a second valve mounted on said housing at the inner end of said passage which, when closed, cuts off communication between said passage and said second port and when open places said inner chamber and passage in said housing in open communication and controls the flow of air therebetween, said second valve being movable to open position by a force exerted thereon superior to the force holding said valve closed, said latter force at least in part including the force created by the pressure of the air in the inner chamber, said second valve additionally, when closed, completely cutting off communication between said first and second ports, said first and second valves being independently operable whereby the normal opening or closing of said first valve will not actuate said second valve, both of said valves being mounted in said housing and bodily removable therewith from said stem to permit rapid deflation of said outer chamber through said first port, said metering port having a cross-section substantially smaller than that of said first port to meter the flow of air to and through said first port, the effective size of said metering port being such as to meter the rate of flow of air to the outer chamber, as compared to the flow of air to the inner chamber when said second valve is open, that the pressure in the inner chamber will build up substantially faster than that in the outer chamber and will be maintained at such higher pressure after inflation by the closing of said second valve, and a third valve between said inner and outer chambers constructed to automatically open and release air from said inner chamber to said outer chamber if and when the pressure in said inner chamber exceeds, by a predetermined amount, the pressure in said outer chamber, said third valve being mounted within said stem.

2. The combination as set forth in claim 1 in which said third valve is mounted on said housing.

3. The combination as set forth in claim 1 in which said third valve is mounted on said housing at its inner end and said second valve is mounted on said third valve, with each being independently operable for their respective purposes.

4. Valving mechanism comprising a hollow valve stem having first and second ports adapted to communicate respectively with the outer and inner chambers of a tire when used therewith, a tubular housing, having a longitudinal passage therethrough, removably mounted in said stem and having at least a portion of its outer wall adjacent the inner wall of said stem spaced from said inner wall in the vicinity of said first port when mounted in said stem, sealing means between the outer wall of said housing and the inner wall of said stem at longitudinally spaced positions at opposite sides of said first port to form an air chamber with the adjacent walls of said stem and housing, a metering third port in a lateral wall of said housing of a cross-section substantially smaller than the cross-section of said first and second ports and communicating with said passage in said housing and with said air chamber to determine the flow of air into said chamber and through said first port while said housing is in said stem, a normally closed first valve in the outer end of said housing openable to permit flow of air under pressure into and out of said passage, a second valve mounted in said passage at the inner end of said stem, which, when closed, cuts off communication between said passage and second port, said first and second valves being mounted for movement to open and closed positions independently of each other, said second valve being openable by a force exerted thereon superior to the force holding said second valve closed as by the force created by air under pressure supplied to said housing during inflation, said housing with said valves being removable as a unit from said stem to provide open communication of said first and second ports with the atmosphere and said first and second ports having a relationship of flow area selected to provide that when said valves have been removed from the stem as a unit and air is exhausting from said outer and inner chambers simultaneously the flow of air from said inner chamber is at a rate such that collapsing of said inner chamber will not occur, and means for removably holding said housing in position within said stem.

5. Valving mechanism as set forth in claim 4 wherein said second valve is irremovably mounted in said housing while said housing is intact.

6. Valving mechanism as set forth in claim 4 wherein the tubular housing is initially formed as separate inner and outer sections to permit mounting of said second valve in said inner section and then assembled and sealed together to make a substantially permanent unitary housing enclosing said second valve within the walls of said tubular stem to thus prevent removal of said second valve from said housing while the latter is intact.

7. Valve mechanism as set forth in claim 4 in which a spring is connected between said first and second valves to constitute an additional closing force for said second valve and being so connected to said first valve that when said first valve is opened the closing force of said spring lessens and when said first valve closes said spring again becomes operative to provide said additional closing force for holding said second valve in closed position.

8. Valve mechanism as set forth in claim 4 in which said stem is provided with a radially extending, axially facing seat adjacent its inner end opposed to the inner end of said housing, and in which one of said sealing means is a compression seal arranged between said seat and the inner end of said housing when said housing is retained therein by said holding means, and the other of said seals is an O-ring seal arranged adjacent the outer end of said housing in slidable engagement with the inner wall of said stem.

9. In combination, a tire having inner and outer chambers, valve mechanism for inflating said chambers comprising a stem having a first port for supplying air to the outer chamber, a second port in said stem for supplying air to the inner chamber, a housing mounted in said stem, longitudinally spaced sealing means between said stem and housing at opposite sides of said first port, a port in said housing in open communication with said first port in said stem, a first valve in the outer end of said housing for admitting air to and for permitting removal of air from said chambers, a second valve at the inner end of said housing for admitting air into said inner chamber on inflation and for releasing air from said inner chamber when the pressure of the air in the inner chamber exceeds a predetermined differential pressure with respect to the pressure in the outer chamber, said second valve comprising a valve barrel, a seat in said housing engageable by said barrel to close the passage through said housing, a spring mounted in said housing normally urging said barrel against said seat in said housing against the pressure of the air in the inner chamber, said barrel having a third valve mounted therein and openable to admit air to said inner chamber through said barrel under a sufficient air pressure in said housing to open the latter valve against the force holding said latter valve closed and independently movable with respect to said first valve, said spring yielding under a predetermined pressure in said inner chamber in excess of that in said housing to move said barrel off its seat and permit air to escape from said inner chamber around said barrel.

10. The combination as set forth in claim 9 in which said barrel has a tapered seat engaging the seat on said housing provided for said barrel.

11. The combination as set forth in claim 9 in which the seat on said housing comprises an axially facing seat and the valve barrel is provided with a seal having an axially facing seat engageable with said axially facing seat on said housing.

12. In combination, a tire having inner and outer chambers, valve mechanism for inflating both said chambers comprising a hollow stem having a first port for admitting air to the outer of said chambers and a second port for admitting air to the inner one of said chambers, a housing in said stem having a passage therethrough, a valve mechanism for controlling the flow of the air into said inner chamber through said second port and for releasing air therefrom when the pressure in said chamber exceeds that in said outer chamber by a predetermined amount, comprising a seat on said housing, a barrel in said housing adapted to engage the seat on said housing, a valve mounted in said barrel, and a spring for normlly urging said barrel against its seat, said valve in said barrel being openable to admit air to said inner chamber when the pressure in said housing is sufficient to overcome the pressure holding that valve closed and said barrel being movable off its seat to release air from said inner chamber when the pressure in said inner chamber is in excess of the desired pressure therein.

13. The combination as set forth in claim 12 in which there is a second spring normally biasing said valve to closed position against said seat in said housing, said first and second springs acting in a direction to urge said valves and barrel respectively in opposite directions to thus control the flow of air into and out of the chamber supplied by one of said ports in said stem, the valve in said barrel permitting the flow of air into said chamber and the barrel being releasable from its seat to permit flow of air out of said chamber by a pressure in that chamber superior to the pressure holding said barrel on its seat.

References Cited

UNITED STATES PATENTS

| | | | |
|---|---|---|---|
| 2,122,740 | 7/1938 | Eckenroth | 152—342 X |
| 2,272,548 | 2/1942 | Creamer | 277—20 |
| 2,501,937 | 3/1950 | Gramelspacher | 152—342 |
| 3,104,676 | 9/1963 | Steer | 137—234.5 |
| 3,191,654 | 6/1965 | Anderson et al. | 152—427 X |

WILLIAM F. O'DEA, *Primary Examiner.*

D. LAMBERT, *Assistant Examiner.*